United States Patent
Watabe (10) Patent No.: US 7,260,497 B2
(45) Date of Patent: Aug. 21, 2007

(54) TIRE AIR PRESSURE MONITORING SYSTEM

(75) Inventor: Nobuya Watabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/446,191

(22) Filed: Jun. 5, 2006

(65) Prior Publication Data
US 2006/0276991 A1   Dec. 7, 2006

(30) Foreign Application Priority Data
Jun. 6, 2005   (JP) ............................. 2005-165597

(51) Int. Cl.
G01L 17/00 (2006.01)
G01L 19/08 (2006.01)
G01L 19/12 (2006.01)

(52) U.S. Cl. .................. 702/140; 73/146; 73/146.2; 73/146.3; 73/146.4; 73/146.5; 340/438; 340/442; 340/447; 702/138

(58) Field of Classification Search ............. 73/146, 73/146.2, 146.3, 146.4, 146.5, 146.8; 340/438, 340/443, 446, 447, 448, 449; 702/138, 140, 702/141, 142, 145; 34/442
See application file for complete search history.

(56) References Cited

U.S. PATENT DOCUMENTS

| | | | |
|---|---|---|---|
| 2,417,940 A * | 3/1947 | Lehman | 200/61.25 |
| 2,727,221 A * | 12/1955 | Sprigg | 340/447 |
| 3,178,686 A * | 4/1965 | Mills | 340/447 |
| 3,223,969 A * | 12/1965 | Course | 340/447 |
| 4,163,208 A * | 7/1979 | Merz | 340/447 |
| 5,263,524 A | 11/1993 | Boardman | |
| 6,218,936 B1 * | 4/2001 | Imao | 340/447 |
| 6,271,748 B1 * | 8/2001 | Derbyshire et al. | 340/442 |
| 6,340,930 B1 * | 1/2002 | Lin | 340/447 |
| 6,505,507 B1 * | 1/2003 | Imao et al. | 73/146.5 |
| 6,545,599 B2 * | 4/2003 | Derbyshire et al. | 340/442 |
| 6,882,270 B2 * | 4/2005 | Stewart et al. | 340/442 |
| 6,972,671 B2 | 12/2005 | Normann et al. | |
| 7,053,761 B2 * | 5/2006 | Schofield et al. | 340/447 |
| 2002/0044050 A1 * | 4/2002 | Derbyshire et al. | 340/442 |
| 2003/0080860 A1 * | 5/2003 | Stewart et al. | 340/442 |
| 2004/0189457 A1 | 9/2004 | Watabe | |
| 2005/0033485 A1 | 2/2005 | Nimmo et al. | |
| 2005/0040941 A1 * | 2/2005 | Schofield et al. | 340/442 |
| 2005/0235744 A1 | 10/2005 | Ogawa | |
| 2006/0276991 A1 * | 12/2006 | Watabe | 702/138 |
| 2006/0279416 A1 * | 12/2006 | Watabe | 340/447 |

FOREIGN PATENT DOCUMENTS

| | | |
|---|---|---|
| EP | 0 982 159 A2 * | 3/2000 |
| JP | 2005-28978 | 2/2005 |
| JP | 2003-291615 | 10/2005 |

* cited by examiner

Primary Examiner—Edward R. Cosimano
(74) Attorney, Agent, or Firm—Nixon & Vanderhye P.C.

(57) ABSTRACT

A tire air pressure monitoring system is provided with at least one trailer-use receiving unit, which is mounted at a rear end of a tractor head to receive radio wave sent by multiple tire air pressure sending units. The tire air pressure sending units are respectively attached to wheels of a trailer. The trailer-use receiving unit, having a directional antenna, is oriented to have a stronger receiving sensitivity with respect to a direction of the trailer than other directions.

19 Claims, 7 Drawing Sheets

TIRE AIR PRESSURE MONITORING SYSTEM

CROSS REFERENCE TO RELATED APPLICATION

This application is based on a Japanese Patent Application No. 2005-165597 filed on Jun. 6, 2005, the disclosure of which is incorporated herein by reference.

FIELD OF THE INVENTION

The present invention relates to a tire air pressure monitoring system. The tire air pressure monitoring system is suitably used for a vehicle, to monitor tire air pressures of wheels of a trailer of the vehicle at the side of a tractor head of the vehicle, for example.

BACKGROUND OF THE INVENTION

Generally, a tire air pressure monitoring system receives radio wave sent by a tire air pressure sending unit, which detects a tire air pressure and sends tire air pressure information by radio. The tire air pressure monitoring system acquires the tire air pressure information from the received radio wave.

Figure 13:
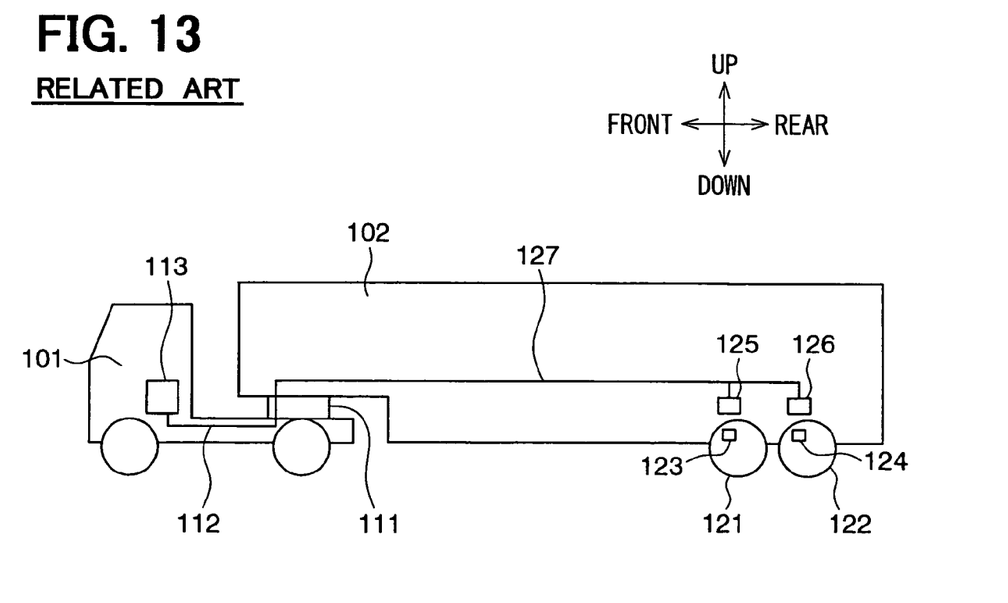
FIG. 13 is a schematic view showing a construction of a tire air pressure monitoring system mounted at a vehicle having a tractor head and a trailer which are connected with each other according to a comparison example.

Referring FIG. 13, the tire air pressure monitoring system is used for a vehicle having a tractor head 101 and a trailer 102 which are connected with each other. In this case, the trailer 102 is connected with a rear portion of the tractor head 101 via a connection portion 111. The tire air pressure sending units 123 and 124 are respectively mounted in wheels 121 and 122 which are arranged at a rear portion of the trailer 102.

Trailer-side receiving units 125 and 126 are mounted at the trailer 102 to receive the radio signal containing the tire air pressure information, which is sent by the tire air pressure sending units 123 and 124. The received signal is outputted to a control unit 113 via wire harnesses 127 and 112 which are connected with each other at the connection portion 111. Based on the tire air pressure information in the received signal, the control unit 113 performs processes such as an indication of the tire air pressure information for a passenger in the vehicle, a storage of the tire air pressure information, a blowout alarm when the tire air pressure violently decreases, and the like.

Thus, in the case of the vehicle having the tractor head and the trailer which are connected with each other, the trailer-side receiving unit 125, 126 receives the radio signal from the tire air pressure sending unit 123, 124. Moreover, the received signal is outputted to the control unit 113 of the side of the tractor head 101 via the wire harnesses 127 and 112.

However, according to the above-described tire air pressure monitoring system, the receiving units 125 and 126 are to be mounted at the trailer 102 of the vehicle.

Moreover, the trailer 102 which is to be connected with the tractor head 101 is generally various. That is, the one tractor head 101 may be selectively connected with the diverse trailers 102, which are usually manufactured by suppliers different from that of the tractor head 101. In this case, it is necessary to accord a specification of an interface of the wire harness 127 of the trailer 102 with that of the wire harness 112 of the tractor head 101, between the different suppliers. Therefore, the construction of the trailer 102 for the tire air pressure monitoring system becomes complex.

SUMMARY OF THE INVENTION

In view of the above-described disadvantages, it is an object of the present invention to provide a tire air pressure monitoring system, which monitors tire air pressures of a trailer connected with a tractor head and has a simplified construction at the side of the trailer.

According to the present invention, a tire air pressure monitoring system has a plurality of tire air pressure sending units which are respectively attached to wheels of a first member of a vehicle to send radio wave containing tire air pressure information of the wheels by radio, at least one antenna for receiving the radio wave, and a tire air pressure receiving apparatus for acquiring the tire air pressure information from signal which is based on the radio wave received by the antenna. The tire air pressure receiving apparatus is mounted at a second member of the vehicle. The antenna is a directional antenna, which is mounted at the second member and oriented to have a stronger receiving sensitivity with respect to a direction of the first member than other directions.

Preferably, the second member is a tractor head, and the first member is a trailer which is connected with a rear portion of the tractor head.

Because the antenna which receives the radio wave from the tire air pressure sending units of the wheels of the trailer is mounted at the tractor head, the tractor head can directly acquire the tire air pressure information of the wheels of the trailer. Thus, the tire air pressure monitoring system can be provided with a simplified construction at the side of the trailer. Moreover, because the antenna is oriented to have the stronger receiving sensitivity with respect to the direction of the trailer than other directions, the tire air pressure information of the wheels (e.g., rear wheels of long trailer, and wheels of aftermost trailer of a group of trailers which are sequentially connected) which is far positioned from the tractor unit can be readily obtained.

Preferably, the tire air pressure monitoring system further has a presentation unit which is mounted at the trailer to offer wheel identification information of the wheels of the trailer. The wheel identification information of the wheels respectively corresponds to identification information of the plurality of tire air pressure sending units attached to the wheels of the trailer. The antenna receives the radio wave, which is sent by the tire air pressure sending unit by radio and contains both the tire air pressure information and the identification information of the tire air pressure sending unit. The tire air pressure receiving apparatus includes a storage unit for memorizing the wheel identification information of the wheels of the trailer, an identification/process unit which fetches the identification information of the tire air pressure sending unit and the tire air pressure information from the radio wave received by the antenna and processes the tire air pressure information as that related to a traveling of the own vehicle when the fetched identification information has a predetermined relation with the wheel identification information memorized in the storage unit, a wheel identification information acquiring unit for acquiring the wheel identification information of the wheels of the trailer from the presentation unit, and a recording unit which obtains the wheel identification information via the wheel identification information acquiring unit at startup of the vehicle, and records the obtained wheel identification information in the storage unit.

Thus, according to the present invention, the wheel identification information presented by the presentation unit will be fresh recorded in the storage unit at startup of the vehicle, which often occurs immediately after a substitution of the trailer. Therefore, the renewing of the wheel identification information recorded in the tire air pressure receiving apparatus can be effectively performed, even when the renewing of the wheel identification information is not consciously performed by, for example, a driver of the vehicle for the every time when the trailer is substituted.

However, in a conventional tire air pressure monitoring system, the wheel identification information of the wheels is beforehand memorized in the storage unit of the tire air pressure receiving apparatus. In the case where the conventional tire air pressure monitoring system is used for the tractor head, the tire air pressure receiving apparatus fetches the tire air pressure information and the identification information of the tire air pressure sending unit from the radio wave received by the antenna. The fetched identification information of the tire air pressure sending unit is compared with the wheel identification information memorized in the storage unit.

Generally, the one tractor head will be selectively connected with the various trailers. However, according to the conventional tire air pressure monitoring system, the wheel identification information of the wheels of the new trailer is to be taken into the storage unit of the tire air pressure receiving apparatus for the every time when the trailer is substituted. That is, the renewing of the wheel identification information is to be performed by the driver for the every time when the trailer is substituted, thus burdening the driver. According to the present invention, as described above, the burden of the driver can be reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

Figure 1:
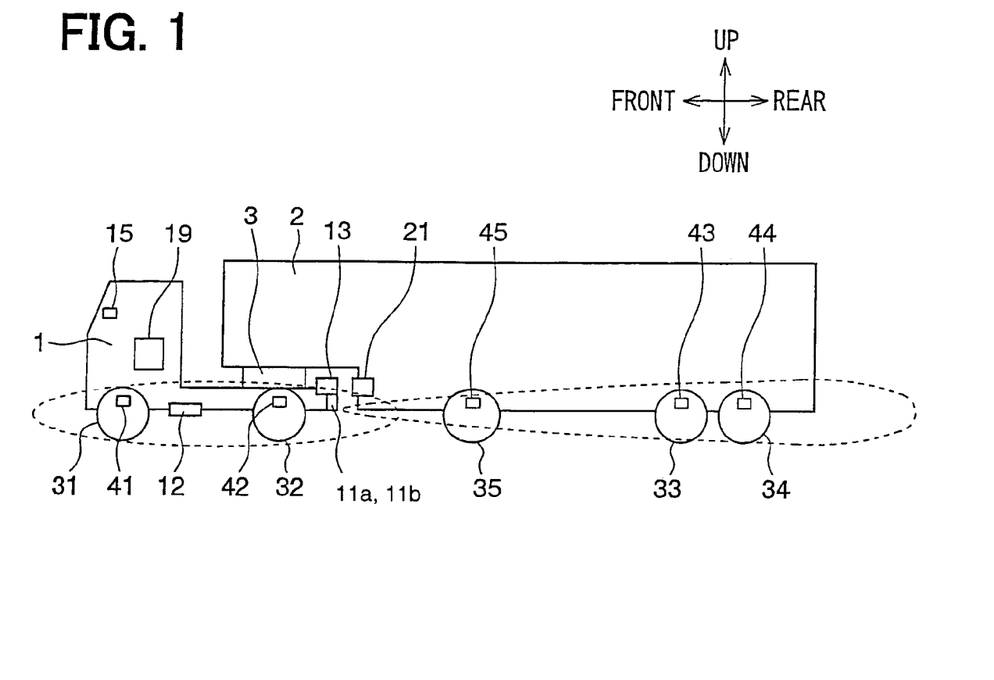
FIG. 1 is a schematic view showing a construction of a tire air pressure monitoring system mounted at a vehicle having a tractor head and a trailer which are connected with each other according to a first embodiment of the present invention.

A tire air pressure monitoring system according to a first embodiment of the present invention will be described with reference to FIGS. 1-8. As shown in FIG. 1, the tire air pressure monitoring system can be suitably used for a vehicle which has a tractor head 1 (second member) and a trailer 2 (first member), for example.

Figure 2:
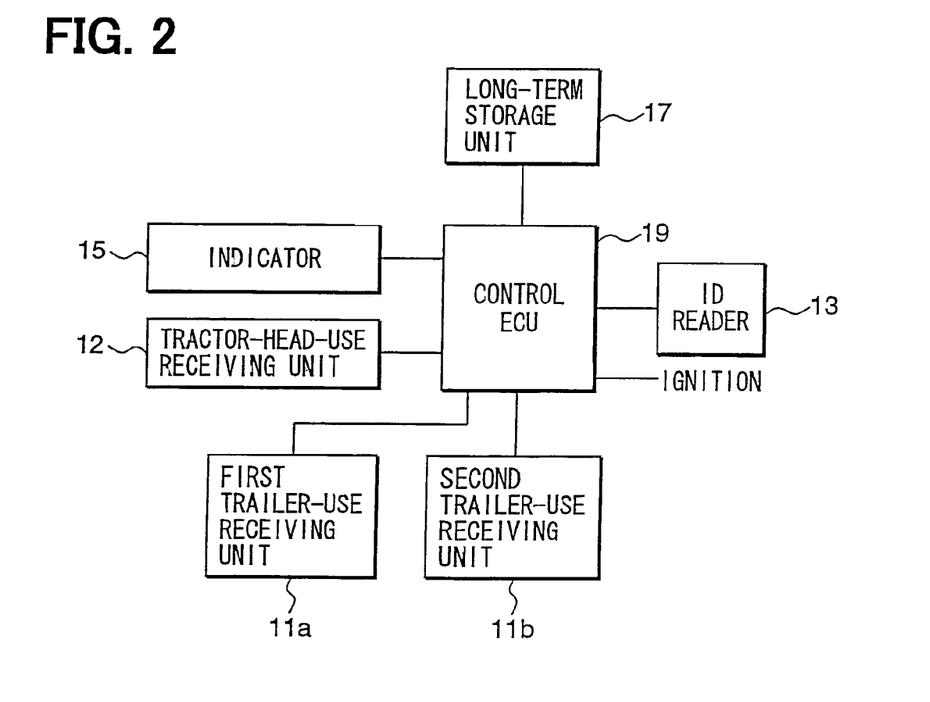
FIG. 2 is a block diagram showing a construction of a tire air pressure receiving apparatus and the like mounted at the tractor head according to the first embodiment.

The trailer 2 is connected with the tractor head 1 at a connection portion 3 of the tractor head 1. FIG. 2 shows a construction and a connection relation of the part of the tire air pressure monitoring system which is mounted at a chassis of the tractor head 1.

Referring to FIG. 1, the tractor head 1 has multiple wheels, for example, a pair of wheels 31 which are respectively symmetrically arranged at a right front portion and a left front portion of the tractor head 1, and a pair of wheels 32 which are respectively symmetrically arranged at a right rear portion and a left rear portion of the tractor head 1. A vehicle (tractor head 1) left-right direction corresponds to a width direction thereof, and a vehicle (tractor head 1) front-rear direction corresponds to a traveling direction thereof.

Similarly, the trailer 2 is provided with multiple wheels, for example, a pair of wheels 35 which are respectively symmetrically arranged at a right front portion and a left front portion of the trailer 2, four wheels 34 which are arranged at a rear portion of the trailer 2, and four wheels 33 which are arranged at the rear portion of the trailer 2 and positioned at the front side of the wheels 34. In this case, for example, two of the wheels 34 are positioned at a right rear portion the trailer 2, and other two of the wheels 34 are symmetrically arranged at a left rear portion of the trailer 2. The wheels 33 are arranged similarly to the wheels 34.

Each of the wheels 31-35 of the tractor head 1 and the trailer 2 is provided with a tire air pressure sending unit which is mounted at a wheel disk thereof. Specifically, at the tractor head 1, the wheels 31 are respectively provided with the tire air pressure sending units 41, and the wheels 32 are respectively provided with the tire air pressure sending units 42. At the trailer 2, referring to FIG. 3, the two wheels 35 are respectively provided with the tire air pressure sending units 45 and 52, the four wheels 33 are respectively provided with the tire air pressure sending units 43, 46, 48 and 50, and the four wheels 34 are respectively provided with the tire air pressure sending units 44, 47, 49 and 51.

The tractor head 1 further has a first trailer-use receiving unit 11a, a second trailer-use receiving unit 11b, a tractor-head-use receiving unit 12, an ID reader 13 (wheel identification information acquiring unit), an indicator 15, a long-term storage unit 17 (storage unit) and a control unit 19 (e.g., ECU). The trailer 2 is provided with a transponder 21

(presentation unit), which is positioned near a rear end (with respect to vehicle traveling direction) of the tractor head 1.

The tire air pressure sending units 41-52 respectively detect tire air pressures of the wheels 31-35. Each of the tire air pressure sending units 41-52 repeatedly (e.g. at periodicity of 60 seconds) sends by radio the information of the detected tire air pressure, along with the identification information (e.g., ID) of the tire air pressure sending unit.

The ID of each of the tire air pressure sending units 41-52 is beforehand memorized in a storage portion of the tire air pressure sending unit. The different tire air pressure sending units 41-52 are respectively provided with the different ID.

Referring to FIG. 2, each of the first trailer-use receiving unit 11a, the second trailer-use receiving unit 11b and the tractor-head-use receiving unit 12 receives radio wave sent by the tire air pressure sending units positioned in the receiving range thereof, and converts the radio wave into electrical signal. The electrical signals from the receiving units 11a, 11b, and 12 are outputted to the ECU 19.

In this case, the first trailer-use receiving unit 11a and the second trailer-use receiving unit 11b (with receiving range indicated by dotted-line range of rear portion in FIG. 1) are arranged to receive the radio waves from the tire air pressure sending units 43-52 attached to the trailer 2. The tractor-head-use receiving unit 12 (with receiving range indicated by dotted-line range of front portion in FIG. 1) is provided to receive the radio wave from the tire air pressure sending units 41 and 42 attached to the tractor head 1.

The first trailer-use receiving unit 11a and the second trailer-use receiving unit 11b are mounted, for example, near a bottom of the rear end of the tractor head 1. The tractor-head-use receiving unit 12, substantially without directivity in a horizontal direction, is positioned at a substantial center of the tractor head 1, for example.

Figure 3:
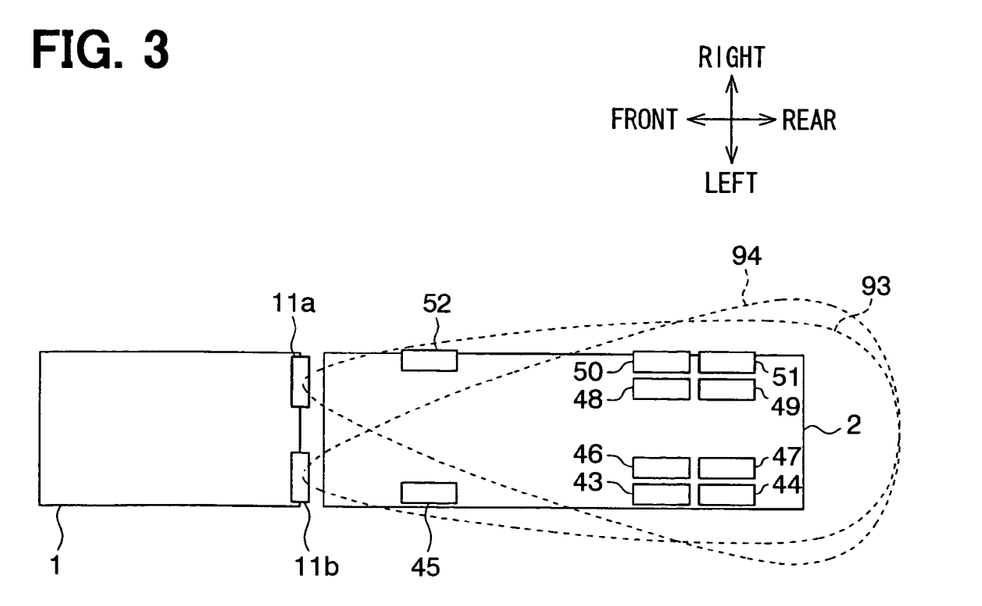
FIG. 3 is a schematic diagram showing receiving-capable ranges and arrangement of a first trailer-use receiving unit and a second trailer-use receiving unit according to the first embodiment.

FIG. 3 shows the arrangement of the first trailer-use receiving unit 11a and the second trailer-use receiving unit 11b. Referring to FIG. 3, the first trailer-use receiving unit 11a and the second trailer-use receiving unit 11b are respectively positioned at a right portion and a left portion of the rear end of the tractor head 1.

Figure 4:
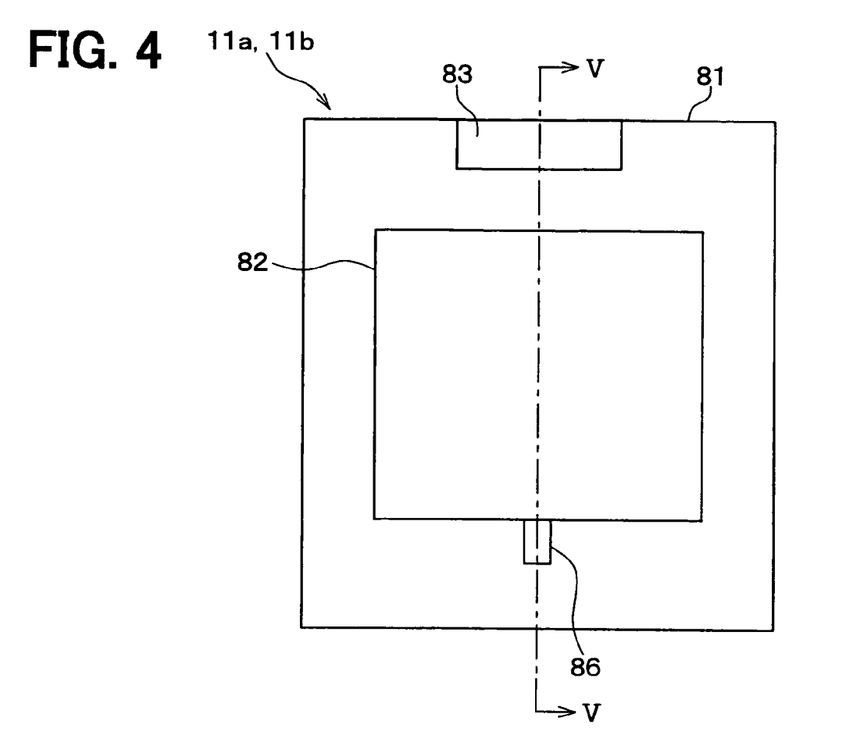
FIG. 4 is a rear view showing the first trailer-use receiving unit/the second trailer-use receiving unit according to the first embodiment.
Figure 5:
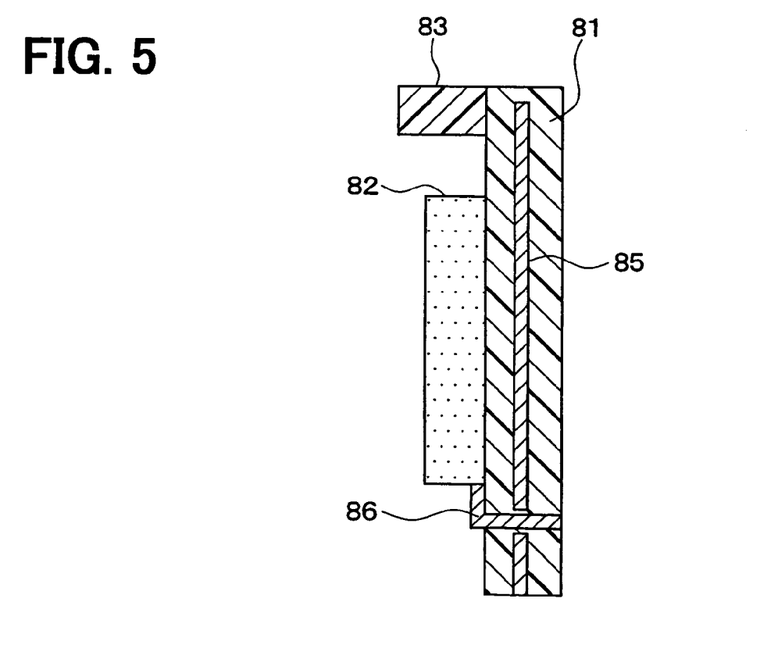
FIG. 5 is a vertical sectional view taken along a line V-V in FIG. 4.
Figure 6:
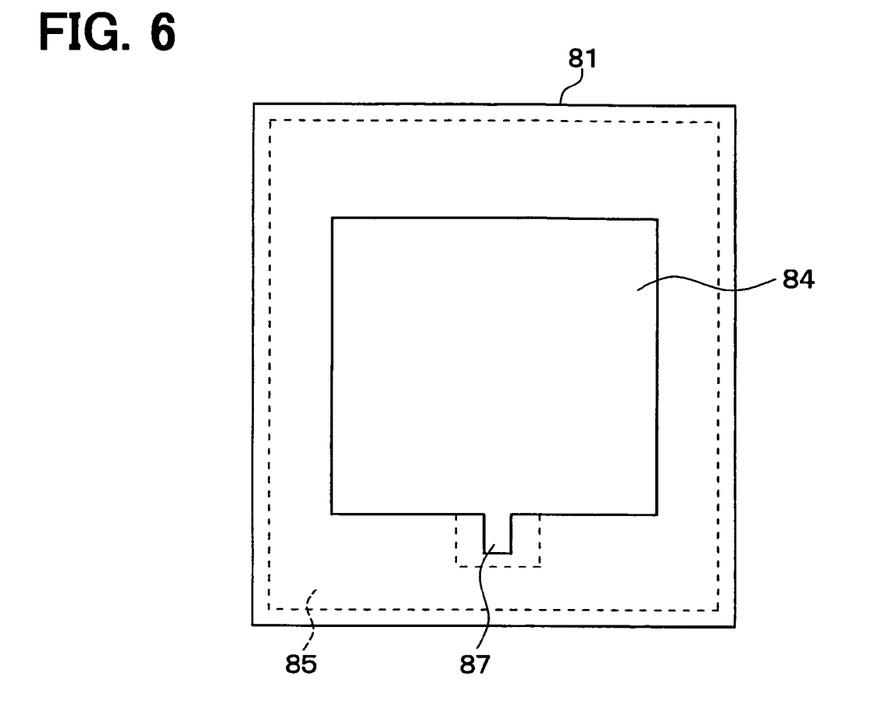
FIG. 6 is a front view showing the first trailer-use receiving unit/the second trailer-use receiving unit according to the first embodiment.

In this embodiment, the first trailer-use receiving unit 11a is provided with the same construction with the second trailer-use receiving unit 11b. Referring to FIGS. 4-6, the receiving unit 11a, 11b has a board 81 made of a dielectric material, a receiving circuit 82 which is mounted at a substantial center portion of an underside (back surface) of the board 81, a connector 83 which is mounted at a rim portion of the underside of the board 81, a planar antenna 84 which is positioned at a substantial center portion of a facade of the board 81, a ground 85 which is embedded in the board 81, and a conductor 86 which penetrates the board 81 from the facade to the underside thereof to electrically connect the planar antenna 84 with the receiving circuit 82. In FIG. 6 which is a front view of the receiving unit 11a, 11b, the ground 85 which is embedded in the board 81 is perspectively indicated by the dotted line.

The radio wave received by the planar antenna 84 is inputted as signal into the receiving circuit 82 (arranged at underside of board 81) via the conductor 86 from a feeding point 87. Thus, the receiving circuit 82 performs an amplification process, a noise elimination process and the like for the inputted signal. Then, the received signal having been processed is outputted to the connector 83 via a conductor pattern (not shown) positioned at the underside of the board 81. The connector 83 is connected with a wire harness, through which the received signal is outputted to the ECU 19.

The board 81, the planar antenna 84 and the ground 85 constructs a patch antenna, which has such a directivity that a receiving sensitivity thereof with respect to the radio wave from a direction perpendicular to the surface of the planar antenna 84 is substantially superlative. In this embodiment, each of the first trailer-use receiving unit 11a and the second trailer-use receiving unit 11b, which is provided with the patch antenna, is arranged so that the facade of the board 81 thereof faces the rear side of the tractor head 1.

Thus, the receiving unit 11a, 11b having the strong directivity is provided with the substantially superlative receiving sensitivity with respect to the radio wave from the rear side of the tractor head 1, typically, as indicated by the dotted-line range 93, 94 in FIG. 3.

In this case, the first trailer-use receiving unit 11a can receive the radio wave from the type air pressure sending unit 52 (mounted at right front wheel 35 of trailer 2), and the type air pressure sending unit 43, 44, and 46-51 which are attached to the wheels 33 and 34 at the rear portion of the trailer 2.

The second trailer-use receiving unit 11b can receive the radio wave from the type air pressure sending unit 45 (mounted at left front wheel 35 of trailer 2), and the type air pressure sending unit 43, 44, and 46-51.

In this case, the first trailer-use receiving unit 11a and the second trailer-use receiving unit 11b are positioned to deviate from each other in the vehicle left-right direction (i.e., width direction of tractor head 1), to mutually supplement fields from which the receiving unit 11a or 11b cannot receive the radio wave.

A length L of one side of the receiving circuit 82 is calculated according to the formula $L=(\lambda/2) \div (\sqrt{\epsilon})$, wherein $\lambda$ is a wave length of the radio wave received by the tire air pressure sending unit and $\epsilon$ is a dielectric constant of the board 81. For example, in the case where a frequency of the received radio wave is substantially equal to 434 MHz and the board 81 is constructed of an ordinary glass epoxy board ($\epsilon \cong 4$), the length L of the one side of the receiving circuit 82 is substantially equal to 17 cm.

The ID reader 13 is attached to the rear end of the tractor head 1 and faces the transponder 21. Thus, based on the control from the control unit 19 (e.g., ECU), the ID reader 13 can obtain the wheel identification information (e.g., ID) which is offered by the transponder 21, and outputs obtained data to the control unit 19.

For example, the ID reader 13 can be constructed of a radio apparatus, which sends by radio an ID-requiring command to the transponder 21 to obtain the wheel identification information and outputs the wheel identification information (which is sent by transponder 21 as result) to the control unit 19. In this case, the transponder 21 can be constructed of a communication apparatus, which sends the wheel identification information (e.g., ID) memorized in the storage portion thereof as a radio signal when the ID-requiring command is received by radio. Specifically, the transponder 21 can be constructed of a RFID (Radio Frequency Identification) tag, and the ID reader 13 can be constructed of a questioning apparatus of the RFID tag. The ID of the tire air pressure sending units 43-52 attached to the wheels 33-35 of the trailer 2 is beforehand memorized in the storage portion of the transponder 21.

The identification information of the tire air pressure sending units 41-52 attached to the wheels 31-35 respectively corresponds to the wheel identification information of the wheels 31-35. The wheel identification information of the wheels 31 and 32 of the tractor head 1 can be beforehand memorized in the long-term storage unit 17, for example.

The indicator 15 visually indicates information such as the tire air pressure information to passengers, based on signals from meters, monitors and the like in the vehicle and the signals from the control unit 19.

The long-term storage unit 17 is a nonvolatile memory (e.g., EEPROM, flash memory), or a backup RAM or the like to continue holding memorized content even when a main power of the vehicle is OFF (e.g., IG OFF and ACC OFF).

The control unit 19 (e.g., ECU) can be constructed of a microcomputer having a CPU, a RAM, a RAM and the like. The CPU performs a program memorized in the ROM to realize valuable functions.

Figure 7:
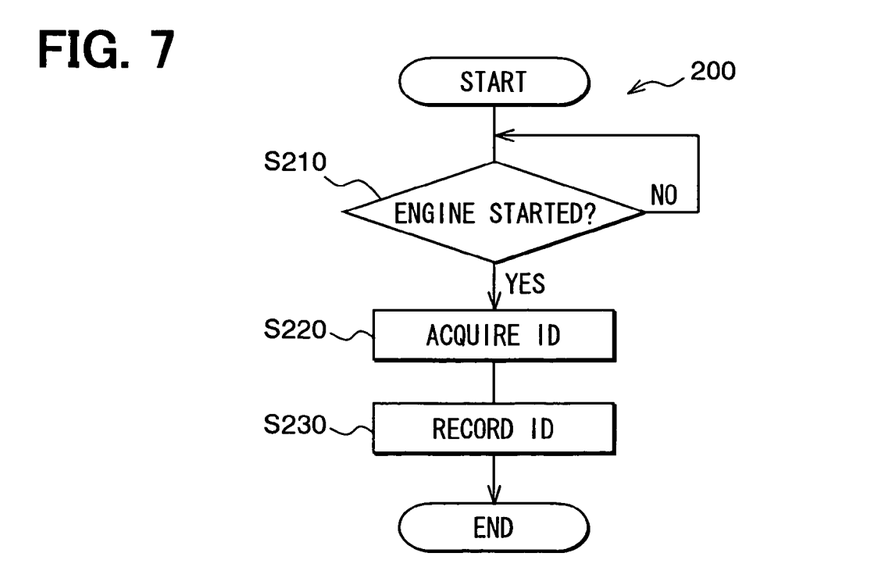
FIG. 7 is a flow chart showing an ID reading program according to the first embodiment.

For example, an ID reading program 200 shown in FIG. 7 can be performed by the CPU of the ECU 19 at startup of the vehicle (e.g., ACC ON). Referring to FIG. 7, at first, at step S210, the ECU 19 waits for a detection that an engine of the vehicle is started, based on signal from an ignition line of the vehicle. That is, the ECU 19 determines whether or not the engine of the vehicle is started, based on the signal from the ignition line.

Then, in the case where it is determined that the engine of the vehicle is started, step S220 will be performed. At step S220, the CPU of the ECU 19 controls the ID reader 13 to acquire the ID (wheel identification information) from the transponder 21. On the other hand, in the case where it is determined that the engine of the vehicle is not started, step S210 will be repeated.

After step S220, the acquired ID is overwritten (recorded) at a predetermined position of the long-term storage unit 17 at step S230. Thereafter, the ID reading program 200 is ended. The ID reading program 200 will be repeated from step S210, for example, after a predetermined time has elapsed from the performing of step S230.

Figure 8:
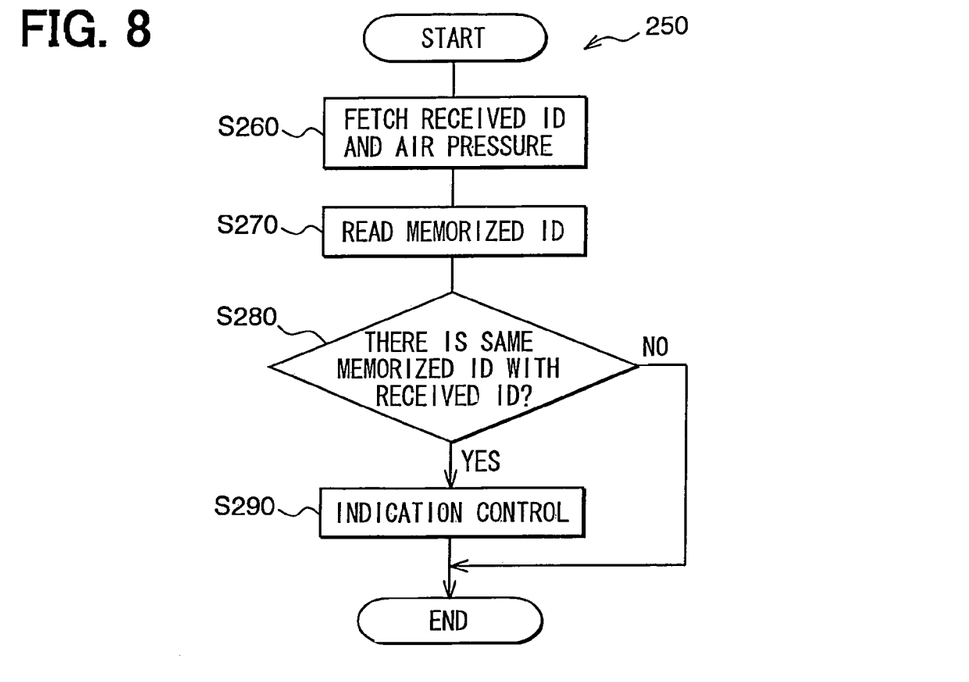
FIG. 8 is a flow chart showing an identification/process program according to the first embodiment.

Moreover, the CPU of the ECU 19 repeatedly performs an identification/process program 250 shown in FIG. 8, when the CPU of the ECU 19 receives the signal (sent by tire air pressure sending unit 41-52) from the receiving unit 11a, 11b, or 12.

Referring to FIG. 8, at first, at step S260, the control unit 19 fetches the ID (identification information) of the tire air pressure sending unit 41-52 and the tire air pressure information from the received signal. Then, at step S270, the ID (wheel identification information) memorized at the above-described predetermined positions of the long-term storage unit 17 is read. Thereafter, at step S280, it is determined whether or not the ID (identification information tire air pressure sending unit 41-52) fetched from the received signal has a predetermined relation with (e.g., equal to) one of the ID (wheel identification information) read from the long-term storage unit 17.

In the case where it is determined that the ID fetched from the received signal is not equal to any one of the ID read from the long-term storage unit 17, the identification/process program 250 will be ended. On the other hand, in the case where it is determined that the ID fetched from the received signal is equal to one of the ID read from the long-term storage unit 17, an indication control or the like will be performed at step S290. Thereafter, the identification/process program 250 will be ended. In this case, the indication control performed at step S290 is a process to indicate at the indicator 15 the tire air pressure information which is fetched at step S260.

The identification/process program 250 will be repeated from step S260, for example, after a predetermined time has elapsed from the performing of step S290.

According to this embodiment, the tractor-head-use receiving unit 12, the ID reader 13, the indicator 15, the long-term storage unit 17 and the control unit 19 constructs a tire air pressure receiving apparatus mounted at the tractor head 1. The tire air pressure monitoring system is provided with the tire air pressure sending units 43-52 which are respectively attached to the wheels 33-35 of the trailer 2 of the vehicle, the antennas (e.g., patch antennas each of which is constructed of board 81, planar antenna 84 and ground 85 of the receiving unit 11a, 11b) for receiving the radio wave (which contains tire air pressure information and identification information of tire air pressure sending unit) sent by the tire air pressure sending units 43-52, and the tire air pressure receiving apparatus which acquires the tire air pressure information from the signal which is based on the radio wave received by the antenna.

The first trailer-use receiving unit 11a and the second trailer-use receiving unit 11b receive the radio wave which is sent by radio by the tire air pressure sending units 43-52 attached to the wheels 33-35 of the trailer 2.

The control unit 19 fetches both the ID (identification information of tire air pressure sending unit) and the tire air pressure information from the signal having been sent from the tire air pressure sending unit 43-52. In the case where the fetched ID (identification information of tire air pressure sending unit) accords with the ID (wheel identification information) in the long-term storage unit 17, the tire air pressure information which is received along with the ID is processed (provided with indication control process or the like) as the tire air pressure information which is related to the traveling of the own vehicle.

The control unit 19 obtains the ID of the tire air pressure sending units 43-52 (attached to wheels 33-35 of trailer 2) from the transponder 21, at startup of the vehicle (specifically, at startup of vehicle engine). The transponder 21 is attached to a front surface of the trailer 2 to face the ID reader 13. The control unit 19 memorizes in the long-term storage unit 17 the obtained wheel identification information for a comparison with the received ID (identification information of tire air pressure sending unit).

According to this embodiment, the ID (wheel identification information of wheels 33-35 of trailer 2) in the transponder 21 will be fresh recorded in the long-term storage unit 17 at startup of the vehicle, which often occurs immediately after the trailer 2 is substituted with other one. Therefore, the renewing of the ID (wheel identification information of wheels 33-35 of trailer 2) in the long-term storage unit 17 can be effectively performed, even when the renewing of the wheel identification information in the long-term storage unit 17 is not consciously performed by, for example, a driver of the vehicle for the every time when the trailer 2 is substituted.

Moreover, because the first trailer-use receiving unit 11a and the second trailer-use receiving unit 11b which receive the tire air pressure information sent by radio from the tire air pressure sending unit 43-52 attached to the wheels 33-35 of the trailer 2 are mounted at the tractor head 1, the construction of the tire air pressure monitoring system at the side of the trailer 2 can be simplified.

Furthermore, each of the first trailer-use receiving unit 11a and the second trailer-use receiving unit 11b, being provided with the directional antenna, is mounted at the rear end of the tractor head 1 and oriented to have the stronger sensitivity of receiving of the signal from the direction (referring to dotted-line ranges 93 and 94 in FIG. 3) of the trailer 2 than that from other directions. Therefore, the tire air pressure information of the wheels 33-35 (e.g., rear wheels of long trailer, and wheels of aftermost trailer of a group of trailers which are sequentially connected) which are positioned far from the tractor unit 1 can be readily obtained.

According to the first embodiment, the first trailer-use receiving unit 11a and the second trailer-use receiving unit 11b are respectively arranged at the positions deviating from each other in the left-right direction of the tractor head 1 (vehicle), to manually supplement the fields where the first trailer-use receiving unit 11a or the second trailer-use receiving unit 11b cannot receive signal. Thus, the admissible position range (where receiving of radio wave is capable) of the tire air pressure sending units 43-52 becomes large. Moreover, the overlap portion between the covering fields (receiving field) of the first trailer-use receiving unit 11a and the second trailer-use receiving unit 11b can be provided with a spatial diversity effect.

Furthermore, because each of the first trailer-use receiving unit 11a and the second trailer-use receiving unit 11b has the planar patch antenna, the length of the one side of the receiving circuit 82 can be suitably altered while matching the receiving frequency, by adjusting the dielectric constant of the board 81.

According to the first embodiment, the CPU of the control unit 19 is used as an identification/process unit by performing the identification/process program 250, and used as a recording unit by performing the ID reading program 200.

Second Embodiment

Figure 9:
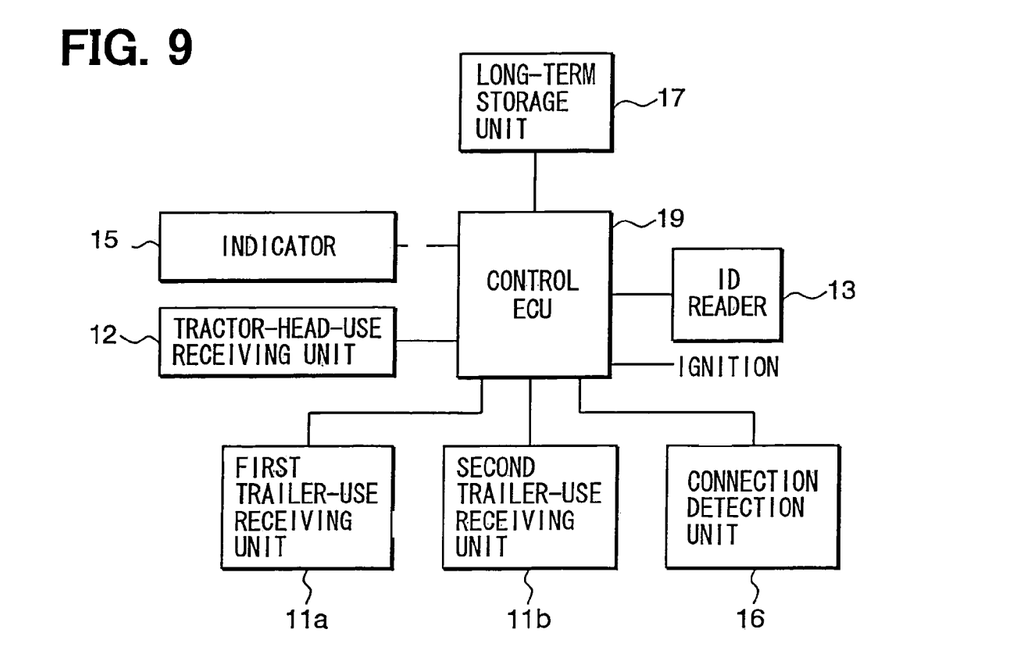
FIG. 9 is a block diagram showing a construction of a tire air pressure receiving apparatus and the like mounted at a tractor head according to a second embodiment of the present invention.

A second embodiment of the present invention will be described with reference to FIGS. 9 and 10. FIG. 9 shows the construction of the tire air pressure monitoring system of the side of the tractor head 1. According to the second embodiment, the connection portion 3 of the tractor head 1 is provided with a connection detection unit 16. That is, the tire air pressure receiving apparatus of the tire air pressure monitoring system further includes the connection detection unit 16.

The connection detection unit 16 is attached to the connection portion 3, to detect whether or not the trailer 2 is connected with the tractor head 1 and output a detection result (as signal) to the control unit 19.

Alternatively, whether or not the trailer 2 is connected with the tractor head 1 can be also determined, by detecting a mechanical arrangement difference of the connection portion 3 between the case where the tractor head 1 is connected with the trailer 2 and the case where the tractor head 1 is not connected with the trailer 2. More alternatively, the connection between the trailer 2 and the tractor head 1 can be also determined, based on the detection of the continuity between the wire harness of the trailer 2 and the tractor head 1.

Figure 10:
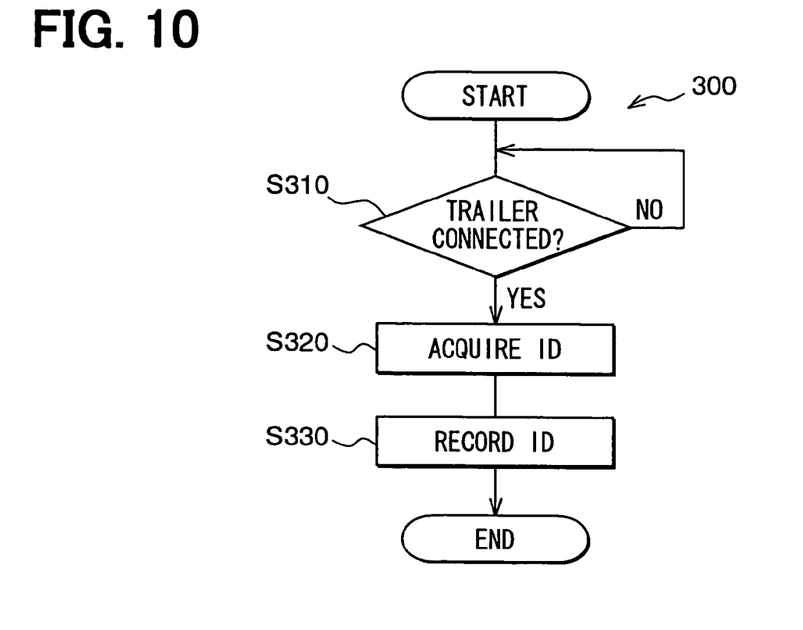
FIG. 10 is a flow chart showing an ID reading program according to the second embodiment.

In this embodiment, the CPU of the control unit 19 repeatedly performs an ID reading program 300 showing in FIG. 10, instead of the ID reading program 200 in the above-described first embodiment. Referring to FIG. 10, at first, at step S310, the control unit 19 waits for a fresh (new) connection of the trailer 2 to the tractor head 1, based on signal from the connection detection unit 16. That is, the control unit 19 determines whether or not there is a fresh connection between the tractor head 1 and the trailer 2 (which can be substituted with other one), based on the signal from the connection detection unit 16.

In the case where it is determined that the trailer 2 is new connected to the tractor head 1, step S320 will be performed. At step S320, the CPU of the control unit 19 controls the ID reader 13 to acquire the ID (wheel identification information of wheels 33-35 of trailer 2) from the transponder 21 arranged at the trailer 2. On the other hand, in the case where it is determined that the trailer 2 is not new connected to the tractor head 1, step S310 will be repeated.

After step S320, the acquired ID is overwritten (recorded) at the predetermined position of the long-term storage unit 17 at step S330. Thereafter, the ID reading program 300 is ended.

The ID reading program 300 will be repeated from step S310, for example, after a predetermined time has elapsed from the performing of step S330.

Thus, based on the connection detection unit 16, the control unit 19 can obtain the wheel identification information of the wheels 33-35 of the trailer 2 from the transponder 21 at the time of the fresh connection, which certainly happens when the trailer 2 connected with the tractor unit 1 is substituted. That is, the wheel identification information of the wheels 33-35 of the trailer 2 is fresh recorded in the long-term storage unit 17. Therefore, the renewing of the wheel identification information in the long-term storage unit 17 can be effectively performed, even when the renewing is not consciously performed by the driver for the every time.

According to the second embodiment, the CPU of the control unit 19 is used as the identification/process unit by performing the identification/process program 250, and used as the recording unit by performing the ID reading program 300.

In the second embodiment, what has not been described about the tire air pressure monitoring system is the same with the first embodiment.

Third Embodiment

A third embodiment of the present invention will be described with reference to FIG. 11.

Figure 11:
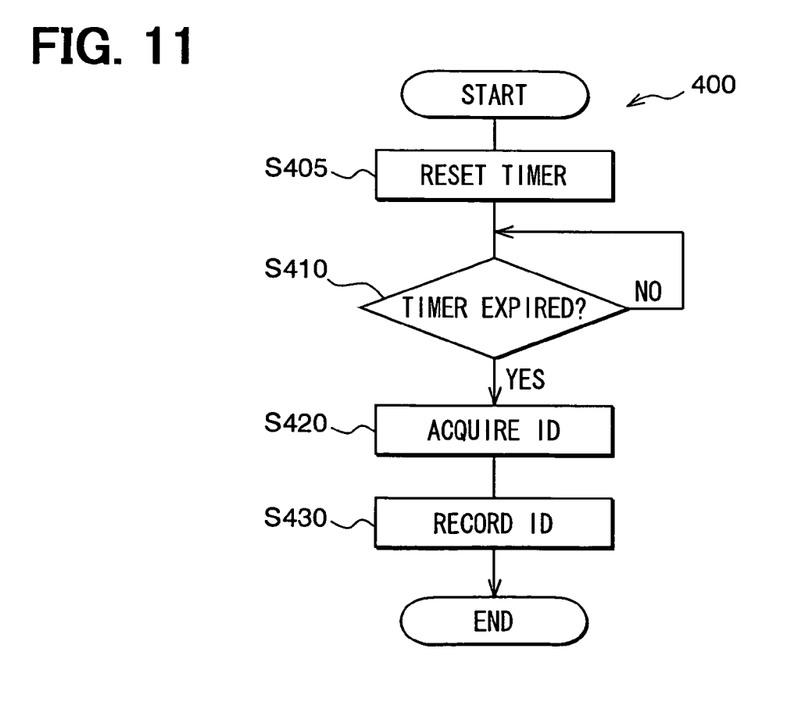
FIG. 11 is a flow chart showing an ID reading program according to a third embodiment of the present invention.

In this embodiment, the CPU of the control unit 19 repeatedly performs an ID reading program 400 showing in FIG. 11 instead of the ID reading program 200. Referring to FIG. 11, at first, at step S405, the control unit 19 resets a timer for a predetermined time. Then, at step S410, the control unit 19 waits for an expiration of the timer. That is, the control unit 19 determines whether or not the predetermined time has elapsed.

In the case where it is determined that the predetermined time has elapsed, step S420 will be performed. At step S420, the CPU of the control unit 19 controls the ID reader 13 to obtain the ID (wheel identification information of wheels 33-35 of trailer 2) from the transponder 21. On the other hand, in the case where it is determined that the predetermined time has not elapsed, step S410 will be repeated.

After step S420, the obtained ID is overwritten (recorded) at the predetermined position of the long-term storage unit 17 at step S430. Thereafter, the ID reading program 400 is ended.

The ID reading program 400 will be repeated from step S405, for example, after a predetermined time has elapsed from the performing of step S430.

Thus, the wheel identification information (e.g., ID) of the wheels 33-35 of the trailer 2 can be automatically obtained from the transponder 21. In this case, the ID in the transponder 21 is periodically repeatedly acquired and memorized in the long-term storage unit 17. Therefore, the renewing of the wheel identification information in the long-term storage unit 17 can be effectively performed, even when the renewing is not consciously performed by the driver for the every time.

According to the third embodiment, the CPU of the control unit 19 is used as the identification/process unit by performing the identification/process program 250, and used as the recording unit by performing the ID reading program 400.

In the third embodiment, what has not been described about the tire air pressure monitoring system is the same with the first embodiment.

Fourth Embodiment

A fourth embodiment of the present invention will be described with reference to FIG. 12. According to this embodiment, the tire air pressure monitoring system is provided with a trailer-use receiving unit 11c. instead of the first trailer-use receiving unit 11a and the second trailer-use receiving unit 11b. The trailer-use receiving unit 11c has a same construction with that of the receiving unit 11a, 11b.

That is, trailer-use receiving unit 11c has the board 81 made of the dielectric material, the receiving circuit 82 which is mounted at the substantial center portion of the underside of the board 81, the connector 83 which is mounted at the rim portion of the underside of the board 81, the planar antenna 84 which is positioned at the substantial center portion of the facade of the board 81, the ground 85 which is embedded in the board 81, and the conductor 86 which penetrates the board 81 from the facade to the underside thereof to electrically connect the planar antenna 84 with the receiving circuit 82.

In this embodiment, the board 81, the planar antenna 84 and the ground 85 of the trailer-use receiving unit 11c construct the patch antenna.

Figure 12:
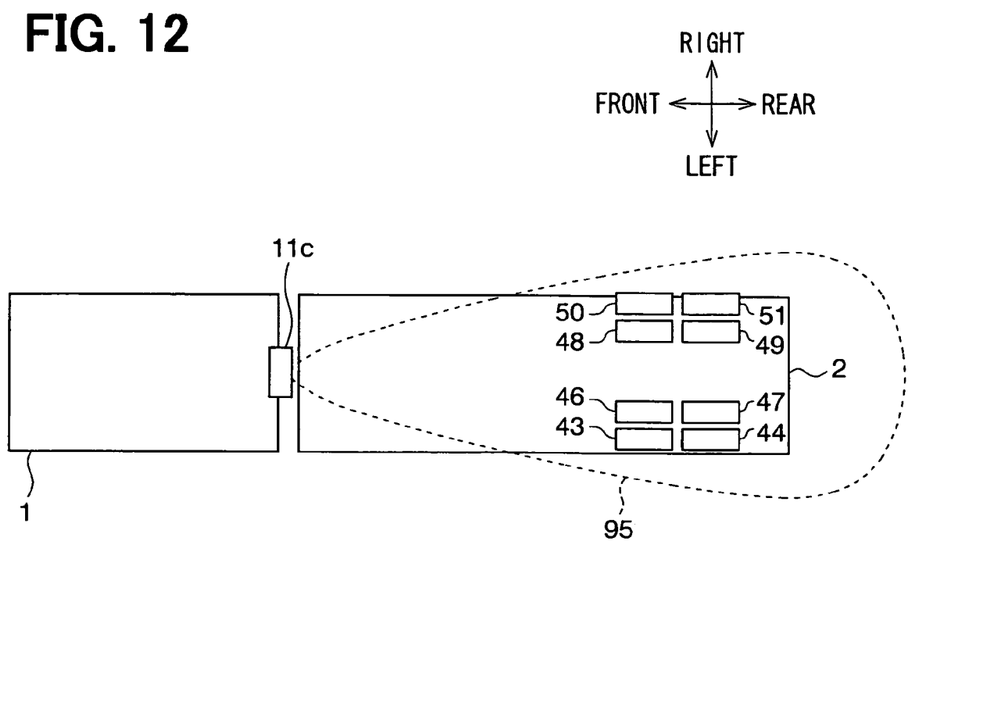
FIG. 12 is a schematic diagram showing a receiving-capable range and arrangement of a trailer-use receiving unit according to a fourth embodiment of the present invention.

As shown in FIG. 12, the trailer-use receiving unit 11c is attached to a substantial center of the rear end of the tractor head 1, and oriented to have a high receiving sensitivity with respect to the radio wave from the rear side of the tractor head 1. The dotted-line range 95 indicates a typical receiving-capable range of the tractor head 11c. In the case where the trailer 2 is only provided with the wheels 33 and 34 (that is, without wheels 35 at front portion of trailer 2) positioned at the rear portion of the trailer 2, the trailer-use receiving unit 11c can receive the radio wave from all of the tire sir pressure sending units 43, 44, and 46-51 (attached to wheels 33 and 34) of the trailer 2.

According to the fourth embodiment, the CPU of the control unit 19 is used as the identification/process unit by performing the identification/process program 250, and used as the recording unit by performing the ID reading program 200, 300 or 400.

In the fourth embodiment, what has not been described about the tire air pressure monitoring system is the same with the first embodiment.

Other Embodiments

Although the present invention has been fully described in connection with the preferred embodiments thereof with reference to the accompanying drawings, it is to be noted that various changes and modifications will become apparent to those skilled in the art.

For example, the presentation unit (presentation medium) 21 can be also constructed of a medium (e.g., paper) where two-dimensional code such as QR code (registered trademark) or the like is printed. The ID reader 13 can be constructed to shoot and decode the two-dimensional code, to output the ID (which is obtained by decoding) of the wheels 33-35 of the trailer 2 to the control unit 19. The photographing of the two-dimensional code can be performed by a camera. In this case, image data of the two-dimensional code which is photographed by the camera can be deciphered by a process device such as a microcomputer which performs a two-dimensional code deciphering program.

Alternatively, the ID reader 13 outputs the photographed image data to the control unit 19, and the control unit 19 deciphers the image data to obtain the ID. In this case, the two-dimensional data where the ID of the wheels 33-35 of the trailer 2 is encoded are printed at the presentation medium 21. The presentation medium 21 is beforehand adhered to the portion of the trailer 2 which faces the ID reader 13 before the connection of the trailer 2 to the tractor head 1.

According to the present invention, the acquisition of the ID by the control unit 19 from the presentation unit 21 or the like is induced by the startup of the vehicle. Referring to the first embodiment, the determination whether or not the engine is started (performed at step S210 shown in FIG. 7) is performed to induce the acquisition of the ID. The determination of the start of the engine can be also replaced by similar processes. For example, a determination whether or not a vehicle velocity varies from zero to non-zero can be also performed based on vehicle velocity pulse signal, to induce the ID acquisition. Alternatively, a determination whether or not the ACC of the vehicle is ON, or a determination whether or not the IG of the vehicle is ON, or the like can be also performed to induce the ID acquisition.

Moreover, the tire air pressure monitoring system can be also provided with the arrangement that at most one of the first trailer-use receiving unit 11a and the second trailer-use receiving unit 11b has the pitch antenna, on the condition that each of the receiving units 11a and 11b is provided with the directional antenna which is mounted at the tractor head 1 and oriented such that the receiving sensitivity thereof with respect to the radio wave from the direction of the trailer 2 is stronger than other directions.

Moreover, according to the first embodiment, at step S280 shown in FIG. 8, it is determined whether or not the ID (wheel identification information) obtained from the presentation unit 21 accords with the ID (identification information of tire air pressure sending unit) received from the tire air pressure sending unit 43-52. The determination can be also replaced by a determination whether or not the obtained ID corresponds with the received ID. That is, it can be determined whether or not one of the obtained ID and the received ID can be derived from the other, or whether or not there exists a predetermined relation between the obtained ID and the received ID. In this case, the correspondence relation between the obtained ID and the received ID can be a one-to-one correspondence, or not the one-to-one correspondence.

Furthermore, at step S290 shown in FIG. 8, the control unit 19 can also record the tire air pressure information in the long-term storage unit 17, instead of the indication of the tire air pressure information. Alternatively, at step S290, it can be also determined whether or not a decrease from a past tire air pressure is violent based on the tire air pressure information, and gives an alarm indication to the passenger in the tractor head 1 via the indicator 15 when the decrease is violent. That is, according to the present invention, at step S290, the control unit 19 can perform any process where the tire air pressure information related to the traveling of the own vehicle is processed differently from that of other vehicle.

Such changes and modifications are to be understood as being in the scope of the present invention as defined by the appended claims.

What is claimed is:

1. A tire air pressure monitoring system, comprising:
a plurality of tire air pressure sending units which are respectively attached to wheels of a trailer of a vehicle to send a radio wave containing tire air pressure information of the wheels by radio;
a plurality of antennas for receiving the radio wave; and
a tire air pressure receiving apparatus for acquiring the tire air pressure information from a signal which is based on the radio wave received by the antennas, the tire air pressure receiving apparatus being mounted at a tractor head of the vehicle, wherein:
each of the antennas is a directional antenna, which is mounted at the tractor head and oriented to have a receiving sensitivity in a direction toward the trailer which is stronger than that in other directions; and
the plurality of antennas are respectively mounted at different positions in a left-right direction of the vehicle so that an overlap portion where receiving fields of the antennas overlap each other has a spatial diversity effect, and the plurality of antennas are arranged in such a manner that the receiving fields thereof cover all of the wheels of the trailer.

2. The tire air pressure monitoring system according to claim 1, wherein at least one of the antennas is a planar patch antenna.

3. The tire air pressure monitoring system according to claim 1, wherein
at least one of the antennas includes a board made of a dielectric material, a planar antenna positioned at a substantial center portion of a facade of the board, and a ground which is embedded in the board.

4. The tire air pressure monitoring system according to claim 1, wherein
the plurality of antennas are arranged in such a manner that each of the receiving fields thereof covers all of the wheels of the trailer.

5. The tire air pressure monitoring system according to claim 1, further comprising
a presentation unit which is mounted at the trailer to offer wheel identification information of the wheels of the trailer, the wheel identification information of the wheel of the trailer corresponding with identification information of the tire air pressure sending unit which is attached to the wheel of the trailer, wherein:
the antennas receive the radio wave, which is sent by the tire air pressure sending unit by radio and contains both the tire air pressure information and the identification information of the tire air pressure sending unit; and
the tire air pressure receiving apparatus which is mounted at the tractor head includes:
a storage unit for memorizing the wheel identification information of the wheels of the trailer;
an identification/process unit which fetches the identification information of the tire air pressure sending unit and the tire air pressure information from the radio wave received by the antennas, and processes the tire air pressure information as tire air pressure information related to the own vehicle when the fetched identification information corresponds with the wheel identification information memorized in the storage unit;
a wheel identification information acquiring unit for acquiring the wheel identification information of the wheels of the trailer from the presentation unit; and
a recording unit which obtains the wheel identification information of the wheels of the trailer via the wheel identification information acquiring unit at startup of the vehicle, and records the obtained wheel identification information in the storage unit.

6. The tire air pressure monitoring system according to claim 5, wherein
the presentation unit which is mounted at the trailer faces the wheel identification information acquiring unit which is mounted at the tractor head.

7. The tire air pressure monitoring system according to claim 5, wherein
the presentation unit is constructed of a transponder, and the wheel identification information acquiring unit is constructed of an ID reader.

8. The tire air pressure monitoring system according to claim 1, further comprising
a presentation unit which is mounted at the trailer to offer wheel identification information of the wheels of the trailer, the wheel identification information of the wheel of the trailer corresponding with identification information of the tire air pressure sending unit which is attached to the wheel of the trailer, wherein:
the antennas receive the radio wave which is sent by the tire air pressure sending unit by radio and contains both the tire air pressure information and the identification information of the tire air pressure sending unit; and
the tire air pressure receiving apparatus which is mounted at the tractor head includes:
a storage unit for memorizing the wheel identification information of the wheels of the trailer;
an identification/process unit which fetches the identification information of the tire air pressure sending unit and the tire air pressure information from the radio wave received by the antennas, and processes the tire air pressure information as tire air pressure information related to the own vehicle when the fetched identification information corresponds with the wheel identification information memorized in the storage unit;
a wheel identification information acquiring unit for acquiring the wheel identification information of the wheels of the trailer from the presentation unit;
a connection detection unit for detecting a connection between the trailer and the tractor head; and
a recording unit which obtains the wheel identification information of the wheels via the wheel identification information acquiring unit based on a detection of the connection by the connection detection unit, and records the obtained wheel identification information in the storage unit.

9. The tire air pressure monitoring system according to claim 8, wherein
the presentation unit which is mounted at the trailer faces the wheel identification information acquiring unit which is mounted at the tractor head.

10. The tire air pressure monitoring system according to claim 8, wherein
the presentation unit is constructed of a transponder, and the wheel identification information acquiring unit is constructed of an ID reader.

11. The tire air pressure monitoring system according to claim 1, further comprising
- a presentation unit which is mounted at the trailer to offer wheel identification information of the wheels of the trailer, the wheel identification information of the wheel of the trailer corresponding with identification information of the tire air pressure sending unit which is attached to the wheel of the trailer, wherein:
- the antennas receive the radio wave which is sent by the tire air pressure sending unit by radio and contains both the tire air pressure information and the identification information of the tire air pressure sending unit; and
- the tire air pressure receiving apparatus which is mounted at the tractor head includes:
  - a storage unit for memorizing the wheel identification information of the wheels of the trailer;
  - an identification/process unit which fetches the identification information of the tire air pressure sending unit and the tire air pressure information from the radio wave received by the antennas, and processes the tire air pressure information as tire air pressure information related to the own vehicle when the fetched identification information corresponds with the wheel identification information memorized in the storage unit;
  - a wheel identification information acquiring unit for acquiring the wheel identification information of the wheels of the trailer from the presentation unit; and
  - a recording unit which obtains the wheel identification information of the wheels via the wheel identification information acquiring unit by a recursion operation, and records the obtained wheel identification information in the storage unit.

12. The tire air pressure monitoring system according to claim 11, wherein
- the presentation unit which is mounted at the trailer faces the wheel identification information acquiring unit which is mounted at the tractor head.

13. The tire air pressure monitoring system according to claim 11, wherein
- the presentation unit is constructed of a transponder, and the wheel identification information acquiring unit is constructed of an ID reader.

14. A tire air pressure monitoring system, comprising:
- a plurality of tire air pressure sending units which are respectively attached to wheels of a trailer of a vehicle to send a radio wave containing tire air pressure information of the wheels by radio;
- a plurality of antennas for receiving the radio wave; and
- a tire air pressure receiving apparatus for acquiring the tire pressure information from a signal which is based on the radio wave received by the antennas, the tire air pressure receiving apparatus being mounted at a tractor head of the vehicle, wherein:
- each of the antennas is a directional antenna, which is mounted at the tractor head and oriented to have a receiving sensitivity in a direction toward the trailer which is stronger than that in other directions; and
- the plurality of antennas are respectively mounted at different positions in a left-right direction of the vehicle, and arranged in such a manner that an overlap portion where receiving fields of the plurality of antennas overlap each other has a central line substantially positioned at a middle between the wheels of a trailer right side and the wheels of a trailer left side of the trailer.

15. The tire air pressure monitoring system according to claim 14, wherein at least one of the antennas is a planar patch antenna.

16. The tire air pressure monitoring system according to claim 14, further comprising
- a presentation unit which is mounted at the trailer to offer wheel identification information of the wheels of the trailer, the wheel identification information of the wheel of the trailer corresponding with identification information of the tire air pressure sending unit which is attached to the wheel of the trailer, wherein:
- the antennas receive the radio wave, which is sent by the tire air pressure sending unit by radio and contains both the tire air pressure information and the identification information of the tire air pressure sending unit; and
- the tire air pressure receiving apparatus which is mounted at the tractor head includes:
  - a storage unit for memorizing the wheel identification information of the wheels of the trailer;
  - an identification/process unit which fetches the identification information of the tire air pressure sending unit and the tire air pressure information from the radio wave received by the antennas, and processes the tire air pressure information as tire air pressure information related to the own vehicle when the fetched identification information corresponds with the wheel identification information memorized in the storage unit;
  - a wheel identification information acquiring unit for acquiring the wheel identification information of the wheels of the trailer from the presentation unit; and
  - a recording unit which obtains the wheel identification information of the wheels of the trailer via the wheel identification information acquiring unit at startup of the vehicle, and records the obtained wheel identification information in the storage unit.

17. The tire air pressure monitoring system according to claim 14, further comprising
- a presentation unit which is mounted at the trailer to offer wheel identification information of the wheels of the trailer, the wheel identification information of the wheel of the trailer corresponding with identification information of the tire air pressure sending unit which is attached to the wheel of the trailer, wherein:
- the antennas receive the radio wave which is sent by the tire air pressure sending unit by radio and contains both the tire air pressure information and the identification information of the tire air pressure sending unit; and
- the tire air pressure receiving apparatus which is mounted at the tractor head includes:
  - a storage unit for memorizing the wheel identification information of the wheels of the trailer;
  - an identification/process unit which fetches the identification information of the tire air pressure sending unit and the tire air pressure information from the radio wave received by the antennas, and processes the tire air pressure information as tire air pressure information related to the own vehicle when the fetched identification information corresponds with the wheel identification information memorized in the storage unit;
  - a wheel identification information acquiring unit for acquiring the wheel identification information of the wheels of the trailer from the presentation unit;

a connection detection unit for detecting a connection between the trailer and the tractor head; and a recording unit which obtains the wheel identification information of the wheels via the wheel identification information acquiring unit based on a detection of the connection by the connection detection unit, and records the obtained wheel identification information in the storage unit.

18. The tire air pressure monitoring system according to claim 14, further comprising a presentation unit which is mounted at the trailer to offer wheel identification information of the wheels of the trailer, the wheel identification information of the wheel of the trailer corresponding with identification information of the tire air pressure sending unit which is attached to the wheel of the trailer, wherein:

the antennas receive the radio wave which is sent by the tire air pressure sending unit by radio and contains both the tire air pressure information and the identification information of the tire air pressure sending unit; and the tire air pressure receiving apparatus which is mounted at the tractor head includes:

a storage unit for memorizing the wheel identification information of the wheels of the trailer;

an identification/process unit which fetches the identification information of the tire air pressure sending unit and the tire air pressure information from the radio wave received by the antennas, and processes the tire air pressure information as tire air pressure information related to the own vehicle when the fetched identification information corresponds with the wheel identification information memorized in the storage unit;

a wheel identification information acquiring unit for acquiring the wheel identification information of the wheels of the trailer from the presentation unit; and a recording unit which obtains the wheel identification information of the wheels via the wheel identification information acquiring unit by a recursion operation, and records the obtained wheel identification information in the storage unit.

19. A tire air pressure monitoring system, comprising:

a plurality of tire air pressure sending units which are respectively attached to wheels of a trailer of a vehicle to send a radio wave containing tire air pressure information of the wheels by radio;

a plurality of antennas for receiving the radio wave; and a tire air pressure receiving apparatus for acquiring the tire air pressure information from a signal which is based on the radio wave received by the antennas, the tire air pressure receiving apparatus being mounted at a tractor head of the vehicle, wherein:

each of the antennas is a directional antenna, which is mounted at the tractor head and oriented to have a receiving sensitivity in a direction toward the trailer which is stronger than that in other directions; and the plurality of antennas are respectively mounted at different positions in a left-right direction of the vehicle, and arranged in such a manner that an overlap portion where receiving fields of the plurality of antennas overlap each other is substantially symmetrical with respect to a trailer-width-direction central line of the trailer.

* * * * *